United States Patent [19]

Lisy

[11] Patent Number: 5,315,094

[45] Date of Patent: May 24, 1994

[54] AUTOMATED RECEIVING STATION FOR INVENTORYING STOCK ITEMS

[75] Inventor: Donald J. Lisy, Downers Grove, Ill.

[73] Assignee: R. R. Donnelley & Sons Co., Lisle, Ill.

[21] Appl. No.: 763,575

[22] Filed: Sep. 23, 1991

[51] Int. Cl.⁵ .......................................... G01G 19/414
[52] U.S. Cl. .................................. 235/385; 198/339.1
[58] Field of Search ............ 198/339.1, 349.5, 349.7, 198/349.95; 235/383, 385

[56] References Cited

U.S. PATENT DOCUMENTS

| | | | |
|---|---|---|---|
| 3,693,737 | 9/1972 | Young et al. | 177/52 |
| 3,734,286 | 5/1973 | Simjian | 209/121 |
| 4,101,366 | 7/1978 | Teraoka et al. | 156/378 |
| 4,276,112 | 6/1981 | French et al. | 156/360 |
| 4,365,148 | 12/1982 | Whitney | 235/383 |
| 4,398,253 | 8/1983 | Karp et al. | 235/383 |
| 4,558,212 | 12/1985 | Hampson | 235/385 |
| 4,621,325 | 11/1986 | Naftzger et al. | 235/385 |
| 4,656,591 | 4/1987 | Goldberg | 235/385 |
| 4,664,590 | 5/1987 | Maekawa | 414/744 R |
| 4,754,863 | 7/1988 | Tsuchiya et al. | 198/339.1 |
| 5,038,283 | 8/1991 | Caveney | 235/385 |
| 5,113,349 | 5/1992 | Nakamura et al. | 235/385 |

FOREIGN PATENT DOCUMENTS 0565964 11/1958 Canada .............. 198/349.5

OTHER PUBLICATIONS

"Introducing DRX Decoding Technology By Accu-Sort Systems" Oct. 1987.

Primary Examiner—Davis L. Willis
Assistant Examiner—Karl D. Frech
Attorney, Agent, or Firm—Wood, Phillips, VanSanten, Hoffman & Ertel

[57] ABSTRACT

An automated receiving station is provided for inventorying stock items. The receiving station comprises a plurality of independently driven conveyor sections arranged sequentially for moving items along a predetermined path from a deposit end to a removal end while reading bar coded labels on the items and weighing the items. Further, identification labels are affixed to those items not otherwise having labels. More specifically, the independently driven conveyor sections include a receiving conveyor section for sequentially receiving items thereon, a scanner conveyor section along which items thereon may be scanned for identifying indicia, a weighting conveyor section for weighting any of the terms positioned thereon and a labeler conveyor section for affixing identifying indicia onto any one of the items. The receiving station also includes an accumulator conveyor section adjacent the labeler conveyor section for receiving items therefrom and a delivery conveyor section where items can be picked up by a transport system or device.

22 Claims, 2 Drawing Sheets 5,315,094

AUTOMATED RECEIVING STATION FOR INVENTORYING STOCK ITEMS

FIELD OF THE INVENTION

This invention relates to automation systems, and more particularly, to an apparatus for automating the processing of inventory items.

BACKGROUND OF THE INVENTION

As can be readily appreciated, printing plants frequently accept delivery of large shipments of paper rolls from paper mills. Before using the paper rolls, the shipments require processing for bookkeeping purposes which can be costly both in terms of time and labor.

First, it is typically the case that each newly arrived paper roll is assigned an identifying number for identification purposes. Generally speaking, most paper rolls already have bar-coded identification labels which are used by the paper mills and, when these identification indicia are used by the printing plant f or bookkeeping purposes, the coded labels have to be scanned and read by appropriate hardware. Some rolls do not have identification indicia labels which necessitates affixing a label with an identification number onto the roll.

Next, the paper rolls need to be weighed and the weight recorded in conjunction with the roll number. Thereafter, the weights of the paper rolls are compared f or accuracy against the invoice from the paper mill. The roll weights are also used for receiving reports, accounts payable reports and general inventory control.

As will be appreciated, the rolls of paper have to be moved around between locations in order to read the mill labels, affix new labels, and/or weigh the rolls. The rolls are typically bulky, tall and difficult to transport. Therefore, a truck or other vehicle is required to transport the rolls between locations which makes processing them even more time and labor intensive.

In general, no matter the way in which shipments of paper rolls are received and processed by printing plants, a costly amount of time and labor is required. Therefore, there is a need for an automated receiving station. Such a station would be useful in other contexts for processing receivable goods for general industrial plants or any other use which may suggest itself to those skilled in the art.

The present invention is directed toward overcoming one or more of the problems discussed above.

SUMMARY OF THE INVENTION

In one aspect of the present invention an automated receiving station is provided for efficiently processing stock items. The receiving station comprises a plurality of conveyor sections arranged sequentially for moving an item along a predetermined path from a deposit end to a removal end. Each of the sections is capable of moving in synchronization with previous and subsequent adjacent sections. The conveyor sections are each separately driven by means of a plurality of conveyor drivers which are provided for imparting movement thereto. Further, control means are provided for controlling each of the conveyor drivers so as to coordinate the movements of adjacent conveyor sections.

In accordance with the invention, a plurality of sensors are provided to sense when a conveyor section has an item positioned thereon. Each sensor is in communication with the control means to prohibit movement of an item onto an occupied conveyor section.

In the exemplary embodiment, a receiving conveyor section is positioned adjacent the deposit end for placement of an item onto the receiving station. A placement sensor is then adapted to sense proper placement of an item on the receiving conveyor section. The placement sensor communicates with the control means, so that an item is not moved onto a subsequent adjacent conveyor section until it is properly oriented.

Additionally, an indicia scanner positioned on an adjacent scanner conveyor section serves to scan an item positioned on the scanner conveyor section for identification indicia. The scanner is in communication with a computing means for storing the identification information. Also, the scanner is in communication with the control means for signalling for movement of the scanner conveyor section and a subsequent adjacent conveyor section when indicia has been read.

Advantageously, a timer is associated with the scanner which provides a preset time period during which the scanner scans an item for indicia. The timer is in communication with an alarm for signalling when indicia were not successfully read automatically on an item within the preset time period.

In accordance with the invention, data entry means are provided for entering identification information for an item. The data entry means are in communication with the computing means for storing identification information and are in communication with the control means to signal for conveyor movement. Specifically, the latter communication link signals for movement of the scanner conveyor section and a subsequent adjacent conveyor section after the information entry.

In a preferred embodiment, a weighing means which is integrally associated with a weighing conveyor section that sequentially follows the scanner conveyor section serves to determine weight information for an item placed thereon. The weighing means is in communication with the computing means for storing the weight information in conjunction with the identification information for each item. The weighing means is also in communication with the control means to signal for movement of the weighing conveyor section and a subsequent adjacent conveyor section when an item positioned on the weighing conveyor section has been weighed.

In one form of the invention, the computing means stores the identification information for a plurality of items in a sequential stack and stores the weight information in conjunction with the oldest item on the stack not having weight information associated therewith.

Additional details include a label printer which prints coded indicia and a label applicator positioned adjacent a labeler conveyor section which affixes a label onto an item. The label applicator is in communication with the control means to signal for movement of the labeler conveyor section and a subsequent adjacent conveyor section after a label has been affixed onto an item positioned on the labeler conveyor section. In addition, the label printer is also preferably in communication with the control means in such manner so as to print a label for an item which does not have an indicia label affixed thereon as received, or has a label on which indicia cannot be satisfactorily read with a scanner.

In a most highly preferred embodiment, a plurality of conveyor sections are suitably positioned adjacent the removal end for the purpose of accumulating items.

Preferably, a delivery conveyor section is also positioned subsequent to the accumulator section and adjacent to the removal end for removing items from the station. Still additionally, the computing means are in communication with an accounts receivable data base for comparing actual weight as received information for each item with invoice (manifest) information.

In a most highly preferred embodiment, elongated generally cylindrical paper rolls are positioned on the scanner conveyor section, and means are provided for rotating the rolls in front of a stationary scanner, and for moving the scanner vertically upwards and downwards relative the rolls (if necessary to locate and read the target). In another version, the scanner might be mounted overhead for scanning labels on top of the roll (i.e., item). If necessary, this overhead scanner could traverse vertically upwards and downwards to facilitate a satisfactory read of the target on consecutive items having varying heights.

Other features and advantages of the invention will be apparent from the following description taken in connection with the accompanying drawings.

DETAILED DESCRIPTION OF THE PREFERRED EMBODIMENT

Figure 1:
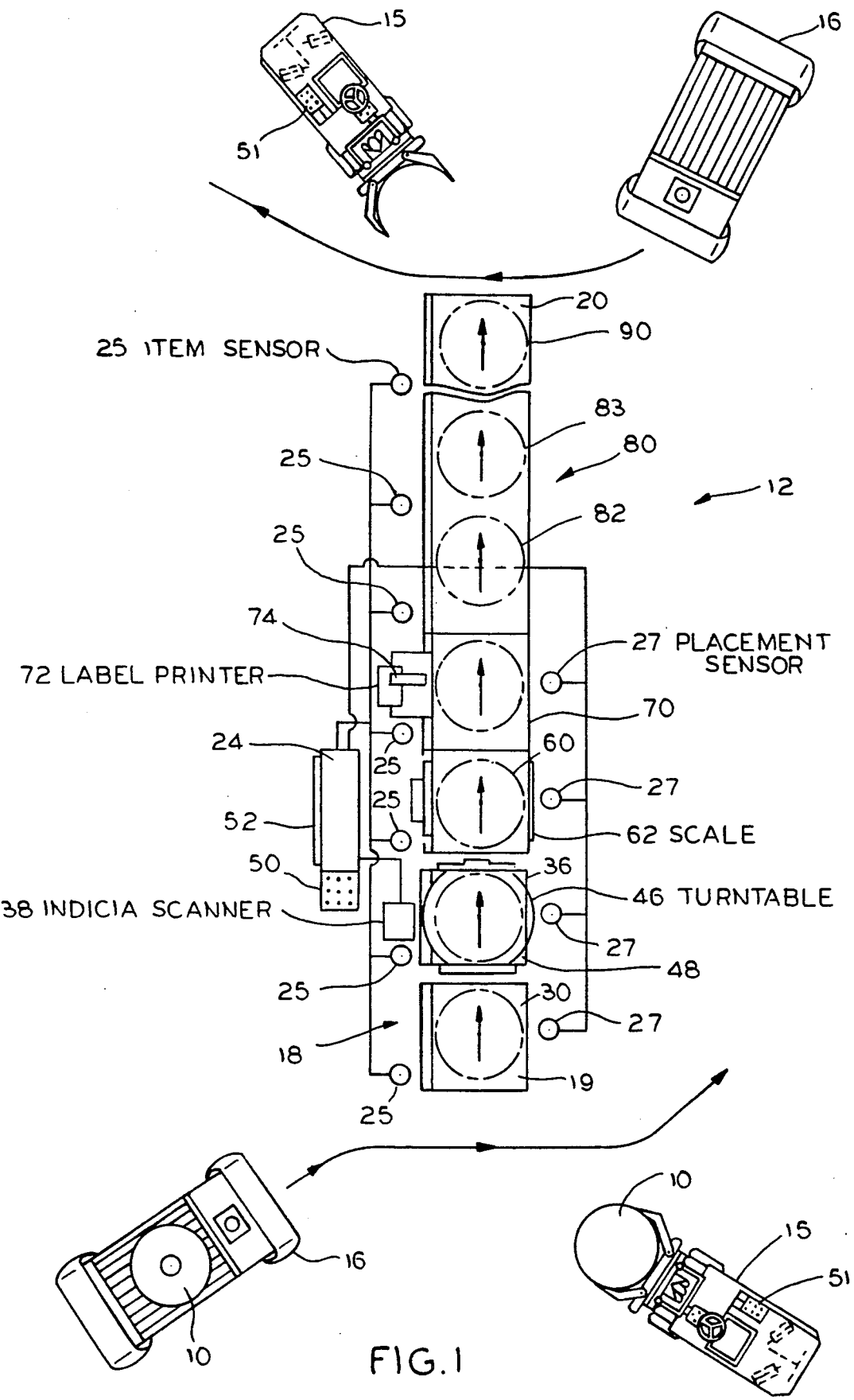
FIG. 1 is a schematic plan view of an automatic paper roll stock receiving station.

Referring to FIG. 1, rolls of paper 10, newly arrived in a printing plant, are removed from boxcars, trucks or the like. The paper rolls 10 are then brought to an automated receiving station, generally designated 12, by means of roll grab trucks 15 and/or automatic guided vehicles (AGVS) 16. As will be appreciated, still other internal transportation systems such as a roll transport conveyor may also be used for appropriate applications. The receiving station 12 is comprised of a plurality of adjacent conveyor sections 18 arranged sequentially for moving a paper roll 10 along a predetermined path. As shown, the path extends from a deposit end 19 to a removal end 20. The conveyor sections 18 are formed such that each is of the same height and they are capable of moving in synchronization with previous and subsequent adjacent conveyor sections.

Figure 2:
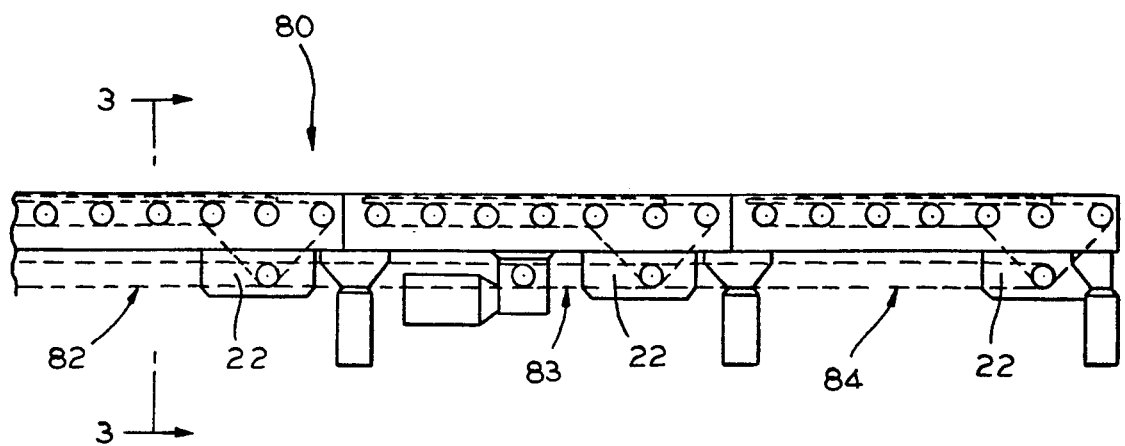
FIG. 2 is a side elevational view of an accumulator section of the receiving station.
Figure 3:
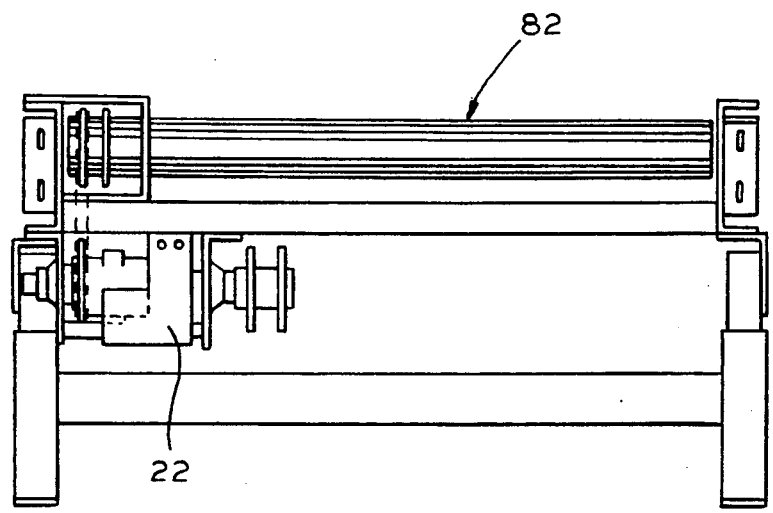
FIG. 3 is a cross-sectional view of a conveyor section taken on the line 2—2 of FIG. 1.

As shown in FIGS. 2 and 3, the conveyor sections 18 are each independently driven by means of one of a plurality of conveyor drivers 22. It will also be seen from FIG. 1 that a controller 24 is provided to control each of the drivers 22. In addition, the controller 24 serves to coordinate movement of adjacent sections 18 for moving a paper roll 10 off one section and onto the next.

An item sensor 25 is associated with each of the conveyor sections 18 for sensing when a paper roll 10 is positioned on a given section. It will be appreciated that each item sensor 25 is in communication with the controller 24 so that a roll 10 is not moved onto a conveyor section 18 that a sensor indicates is occupied. A conveyor section 18 which is in the process of moving a paper roll 10 onto a subsequent section is considered to be unoccupied by the controller 24.

The paper rolls 10 are placed on a receiving conveyor section 30 adjacent the deposit end 19 of the receiving station 12 in an upright, vertical orientation by the delivery vehicles 15, 16. A placement sensor 27 determines when the roll 10 has been properly placed on the deposit section 30. Upon delivery and proper placement of a paper roll 10 on the deposit section 30, the clamp truck 15 or AGV 16 immediately returns to the boxcar, truck or the like to unload another roll 10.

The placement sensor 27 and the item sensor 25 for the subsequent adjacent section 18 are both in communication with the controller 24. When the paper roll 10 is properly positioned and the subsequent adjacent section 18 is unoccupied, the controller 24 signals the drivers 22 of the respective sections to activate the sections so that the roll 10 moves onto the subsequent adjacent section and is properly placed thereon. If desired, there may be additional conveyor sections between the sections shown in FIG. 1 functioning as waiting areas when subsequent sections are occupied.

As shown in FIG. 1, adjacent and subsequent to the receiving conveyor section 30 is a scanner conveyor section 36. A scanner 38 is positioned adjacent and/or over the scanner conveyor section 36 for scanning a paper roll 10 positioned on the scanner conveyor section 36 for encoded indicia. With this arrangement, the indicia scanner 38 reads indicia on a roll 10 for identification information such as a unique roll number.

Identification indicia, such as a bar code having a unique roll number, are generally affixed to both the sides and tops of wrapped paper rolls 10 making it possible for either a side or top scanner to be used. As is known, there are a variety of commercially available scanners that can be used including stationary laser scanners, vision systems, or omni-directional scanners such as those made by Accu-sort Systems.

Referring to FIG. 1, a fixed, side scanner 38 reads coded labels from the sides of paper rolls 10 positioned on the scanner conveyor section 36. A roll turntable 46 is an integral component of the scanner conveyor section 36. With the roll turntable 46, the paper rolls 10 can each be lifted above the conveyor surface 48 and rotated until a successful read is made.

Based upon current technology, depth of field of stationary scanners is on the order of 10–40 inches, which is sufficient to accommodate variations in roll diameters. Variations in the heights of the paper rolls or locations of the label along the sides of the paper rolls could be accommodated by multiple stacked scanners, vertical movement of the scanner, or use of a special scanner capable of automatically adjusting to varying distances from the target. As will be appreciated, a lift mechanism could also be used for raising and lowering a paper roll 10 on a timed basis in order to assist the scanning of the entire height of the roll 10. Alternatively, using an omni-directional top scanner would not require the rotation of the roll 10. However, accommodations would still need to be made for variations in roll heights.

As shown in FIG. 1, the scanner 38 is in communication with the controller 24. When a successful read is made, the controller 24 is signalled to move the conveyor drivers 22 of the scanner section 36 and the subsequent adjacent section to index the paper roll 10. Of course, this occurs provided the item sensor 25 on the subsequent adjacent section indicates it is unoccupied.

A timer is advantageously integrally incorporated into the scanner 38 so as to structure a preset time period during which to scan the paper roll 10 for a readable mill label. If the scanner 38 has been unsuccessful in locating a readable mill label, audio-visual alarms are actuated to alert roll grab truck operators to manually enter a roll number by reason of the failure to read.

Still referring to FIG. 1, a fixed keyboard 50 is provided for entering a roll number for those instances where manual entry is required. Alternatively, keyboard entry may be performed on an RF terminal 51 mounted on a roll grab truck 15 but, in either case, after the roll number has been entered, the alarms are turned off and the system is returned to the automatic mode. As will be appreciated, the keyboard or terminal is in communication with the controller 24 to signal the drivers 22 to index the roll 10 onto the next section. Whether read from the coded indicia or keyed in at a keyboard or terminal, the roll number is held in a FIFO stack in a computer 52 along with an indicator as to whether the roll number was automatically or manually entered.

A weighing conveyor section 60, equipped with an integral load cell scale 62, sequentially follows the scanner section 36. A placement sensor 27 indicates when a paper roll 10 is properly positioned on the scale 62 for recording the weight information.

The weight information for the roll 10 is automatically combined in the computer 52 with the roll number from the oldest item on the stack not having weight information. This combined information is uploaded to a division host computer and/or inventory control computer to generate a paperless receiving report and to provide input for the paper roll inventory system. In addition, the uploading of this combined information serves to provide checks against an electronically-received roll manifest from the paper mill for the roll shipment lot being received.

Unsatisfactory discrepancies are noted on an exception report automatically issued to accounts payable. The paper mill's billing can also be electronically-received and automatically checked for accuracy. When no sizable discrepancies between the receiving report and manifest are noted by the computer, the billing can be automatically paid.

The scale 62 is in communication with the controller 24. In that way, after the roll weight has been satisfactorily captured, the paper roll 10 can be automatically indexed onto the next adjacent conveyor section. Of course, this is provided the sensor on that section indicates it to be unoccupied.

Still referring to FIG. 1, following the weighing conveyor section 60 is a labeler conveyor section 70 which has a pressure-sensitive label printer 72 and a label applicator 74. As the paper roll 10 travels through the section 70, a bar coded label containing any manually entered roll number may be automatically printed and applied to the roll 10 on the top or side thereof.

The printer prints labels only for those rolls which do not have a readable bar coded label. The controller 24 checks the entry in the stack corresponding to the paper roll 10 on the labeler section 70 as to whether an indicator shows that the roll number was manually entered, and it is in communication with the label printer 72 and label applicator 74 to signal when a roll should be labeled. Otherwise, the paper roll 10 is indexed provided the subsequent adjacent section is free.

Alternatively, for bar code reading uniformity in subsequent paper roll handling and consumption operations, all rolls processed through the labeler conveyor section 70 could receive an in-house generated bar-coded label in order to control bar code quality and uniformity.

As shown in FIG. 2, adjacent and subsequent to the labeler conveyor section 70 is the accumulator conveyor sections 80 comprising respective sections 82, 83, etc. Each of the accumulator conveyor sections 82, 83, etc. will be seen to have its own independent driver 22. The paper rolls 10 move between accumulator conveyor sections when item sensors 25 on the subsequent adjacent section indicates it to be unoccupied to thereby free up the prior adjacent conveyor section.

Referring to FIG. 1, the final conveyor section adjacent the removal end 20 is a delivery section 90 from which a high stacker roll grab truck 15, AGV 16 or other roll transport system such as a conveyor or the like can pick up the paper rolls 10 at the delivery section 90.

The conveyor sequencing is controlled by a small industrial programmable controller logic unit 24 mounted in a control panel with power distribution for conveyor drives 22. The scanner 38, scale 62, label printer 72 and label applicator 74 each contain separate self-contained logic networks that allow each particular segment of the system to function as described hereinabove. A multiplexing unit interfaces all controls to allow communication with the operator radio frequency terminals on roll grab trucks 15 and the division host and/or inventory control computers.

As will now be appreciated, this system has the advantage of accomplishing paper roll receiving operations automatically. The system operates such that each roll that is received is identified and weighed, and the system also provides bar code labels for rolls when necessary and automatically applies those labels to the rolls. The weight data are combined with the mill identifiers and interfaced with other computer systems to provide paperless data input for receiving reports, manifest correlation, accounts payable and inventory control. Furthermore, the system provides flexibility in being able to interface with all types of roll-handling equipment and systems.

Therefore, rolls are efficiently processed for storage while conserving time and labor. This occurs by avoiding movement between various areas for weighing the roll and reading an identification number. In general, the automation of the accounts receivable records provides for easier error-free processing.

As will be readily known to those having skill in the art, the receiving station 12 may be used in a number of applications in addition to processing rolls for a printing plant.

While in the foregoing a detailed description of the preferred embodiment has been set forth for purposes of illustration, it will be appreciated that the details herein given may be varied by those skilled in the art without departing from the true spirit and scope of the appended claims.

I claim:

1. An automated receiving station, comprising:
   a plurality of conveyor sections arranged sequentially for moving an item along a predetermined path from a deposit end to a removal end, each of said conveyor sections being capable of moving in synchronization with an adjacent section;
   a plurality of conveyor drivers for separately driving each of said conveyor sections;
   control means for controlling each of said conveyor drivers, said control means being capable of coordinating the movements of adjacent conveyor sections;

scanning means positioned adjacent one of said conveyor sections for scanning an item for indicia and reading said indicia to determine identification information for said item when said item is positioned on said one of said conveyor sections;

said scanning means being in communication with computing means for automatically entering said identification is information for said item for storage in said computing means when said scanning means has read said indicia on said item, said scanning means being in communication with said control means for signalling for movement of said one of said conveyor sections and a subsequent adjacent conveyor section after said identification information has been automatically entered into said computing means; and data entry means in communication with said computing means for manually entering said identification information for said item for storage in said computing means when said scanning means has not read said indicia on said item, said data entry means also being in communication with said control means for signalling for movement of said one of said conveyor sections and a subsequent adjacent conveyor section after said identification information been manually entered into said computing means.

2. The automated receiving station of claim 1 further comprising a timer associated with said scanning means for allowing a preset time period during which to successfully scan said item for said indicia.

3. The automated receiving station of claim 2 further comprising an alarm in communication with said scanning means for signalling when said indicia were not successfully scanned on said item within said preset time period.

4. The automated receiving station of claim 1 further comprising a receiving conveyor section adjacent said deposit end for placement of said item onto said receiving station.

5. The automated receiving station of claim 4 further comprising placement means for sensing proper placement of said item on said receiving conveyor section at said deposit end of said receiving station.

6. The automated receiving station of claim 5 wherein said placement sensing means is in communication with said control means to prevent movement of said receiving conveyor section until said item is properly placed.

7. The automated receiving station of claim 5 wherein said item comprises an elongated cylindrical paper roll and said placement sensing means senses that said roll is upright and centrally positioned.

8. The automated receiving station of claim 1 further comprising means for producing relative movement between said item positioned on said one of said conveyor sections and said scanning means.

9. The automated receiving station of claim 1 wherein said item comprises an elongated cylindrical paper roll and including mean for moving said scanning means vertically up and down relative to said elongated cylindrical paper roll as it is rotated.

10. The automated receiving station of claim 1 further comprising weighing means for obtaining weight information for said item placed thereon, said weighing means being associated with a weighing conveyor section downstream of said one of said conveyor sections where said scanning means is positioned, said weighing means being in communication with said computing means for automatically entering said weight information for said item for storage in said computing means in conjunction with said identification information for said item, said weighing means being in communication with said control means for signalling for movement of said weighing conveyor section and a subsequent adjacent conveyor section after said weight information has been automatically entered into said computing means.

11. The automated receiving station of claim 10 wherein said computing means stores said identification information for a plurality of said items in a sequential stack and stores said weight information in conjunction with the oldest of said items on said stack not having weight information associated therewith.

12. The automated receiving station of claim 10 further comprising a scale sensor in communication with said weighing means to signal said weighing means when said item is properly positioned on said weighing conveyor section to obtain said weight information for said item.

13. The automated receiving station of claim 1 further comprising a label printer for printing coded indicia and a label applicator positioned adjacent a labeler conveyor section for affixing a label onto said item, said label applicator being in communication with said control means for signalling for movement of said labeler conveyor section and a subsequent adjacent conveyor section after said label has been affixed onto said item positioned on said labeler conveyor section.

14. The automated receiving station of claim 13 wherein said label printer is in communication with said control means so as to print a label when said item does not have said indicia thereon.

15. The automated receiving station of claim 1 including a plurality of accumulator conveyor sections downstream of said one of said conveyor sections adjacent said removal end to accumulate said items.

16. The automated receiving station of claim 15 including a delivery conveyor section downstream of said accumulator conveyor sections and adjacent said removal end for removal of said items from said station.

17. The automated receiving station of claim 1 further comprising a plurality of item sensing means for sensing when one of said conveyor sections has an item positioned thereon, one of said item sensing means being associated with each of said conveyor sections, and each of said item sensing means being in communication with said control means to prohibit an item moving onto any occupied one of said conveyor sections.

18. The automated receiving station of claim 10 wherein said computing means is in communication with an accounts receivable data base for comparing said weight information for each of said items with respective invoice information.

19. An automated receiving station for sequentially inventorying a plurality of stock items, said receiving station, comprising:

a receiving conveyor section for sequentially receiving items thereon, said receiving conveyor section having driving means for moving said items placed thereon, said items being moved by said driving means in a predetermined path;

a scanner conveyor section adjacent to said receiving conveyor section and movable in synchronization therewith, said scanner conveyor section having driving means for moving any of said items placed thereon in a predetermined path;

a weighing conveyor section adjacent to said scanner conveyor section and movable in synchronization therewith, said weighing conveyor section having driving means for moving any of said items placed thereon in a predetermined path;

a labeler conveyor section adjacent to said weighing conveyor section and movable in synchronization therewith, said labeler conveyor section having driving means for moving any of said items placed thereon in a predetermined path;

an accumulator conveyor section adjacent to said labeler conveyor section and movable in synchronization therewith, said accumulator conveyor section having driving means for moving any of said items placed thereon in a predetermined path;

a delivery conveyor section adjacent to said accumulation conveyor section and movable in synchronization therewith, said delivery conveyor section having driving means for moving any of said items placed thereon in a predetermined path;

control means for coordinating movements of adjacent ones of said conveyor sections;

a scanner positioned adjacent said scanner conveyor section for scanning any of said items positioned on said scanner conveyor section for identifying indicia thereon;

scale means integral with said weighing conveyor section for weighing any of said items positioned on said weighing conveyor section for determining weight information therefor;

computer means in communication with said scanner and said scale means for storing identifying and weight information for said items;

means for entering identifying indicia into said computer means; and labeler means for affixing identifying indicia onto any one of said items, said labeler means being positioned adjacent to said labeler conveyor section.

20. The automated receiving station of claim 19 further comprising:

means for signalling said control means when said identifying indicia has been read by said scanner to begin coordinating movements of said conveyor sections; and means for signalling when any of said items positioned on said scanner conveyor section does not have identifying indicia which can be scanned by said scanner.

21. An automated method of inventorying a plurality of paper rolls for a printing plant, comprising the steps of:

(1) placing a paper roll vertically upright onto a loading section of a powered conveyor;

(2) sensing when said paper roll is properly placed on said loading section of said powered conveyor;

(3) moving said paper roll from said loading section onto a scanner section of said powered conveyor;

(4) scanning said paper roll on said scanner section with a scanner to locate identifying indicia;

(5) storing identification information associated with said identifying indicia in a computer;

(6) moving said paper roll onto a weighing apparatus to determine weight information therefor;

(7) storing said weight information with said identification information for said paper roll;

(8) moving said paper roll to an accumulation section of said powered conveyor;

(9) moving said paper roll to a delivery section of said powered conveyor; and

(10) removing said item from said delivery section of said powered conveyor for storage.

22. The method of claim 21 further comprising the steps of:

(1) identifying a paper roll not having identifying indicia;

(2) keying in identification information for said paper roll not having identifying indicia; and (3) placing a label containing said identifying indicia onto said paper roll.

* * * * *